US006951187B1

(12) United States Patent
McKoy

(10) Patent No.: US 6,951,187 B1
(45) Date of Patent: Oct. 4, 2005

(54) ANIMAL FEEDING STATION

(76) Inventor: Steven P. McKoy, 1509 Thurman Way, Folsom, CA (US) 95630

( * ) Notice: Subject to any disclaimer, the term of this patent is extended or adjusted under 35 U.S.C. 154(b) by 0 days.

(21) Appl. No.: 10/874,673

(22) Filed: Jun. 24, 2004

(51) Int. Cl.[7] .......................... A01K 5/00; A01K 7/00
(52) U.S. Cl. ...................................... 119/51.5; 119/72
(58) Field of Search ........................ 119/51.01, 51.5, 119/61.5, 72, 253, 255; D30/121, 129, 132, D30/133, 103; 428/17, 18, 19, 20; 446/82, 446/476

(56) References Cited

U.S. PATENT DOCUMENTS

| | | | |
|---|---|---|---|
| D167,243 S | * | 7/1952 | Yellin .................. D30/102 |
| 2,659,345 A | * | 11/1953 | Herbert ................ 119/28.5 |
| 2,751,880 A | * | 6/1956 | Markowski ............ 119/246 |
| 2,845,896 A | | 8/1958 | Copeland |
| 4,161,924 A | | 7/1979 | Welker |
| 4,334,501 A | | 6/1982 | McDaniel et al. |
| D270,672 S | * | 9/1983 | Zelinger ................ D30/130 |
| 5,054,431 A | * | 10/1991 | Coviello ............... 119/61.56 |
| 5,176,104 A | | 1/1993 | Baxter |
| 5,222,990 A | * | 6/1993 | Elliott .................. 119/51.5 |
| D357,769 S | | 4/1995 | Connelly |
| 5,560,316 A | * | 10/1996 | Lillelund et al. ....... 119/61.5 |
| 5,615,640 A | | 4/1997 | Luiz |
| D387,004 S | * | 12/1997 | McSparin ............. D11/145 |
| D492,452 S | * | 6/2004 | White .................. D30/129 |
| 2003/0236048 A1 | * | 12/2003 | Lee et al. .............. 446/82 |

* cited by examiner

Primary Examiner—T. Nguyen

(57) ABSTRACT

An animal feeding station for domesticated pets includes a base provided with a contoured top surface that has receptacles formed therein for receiving and storing food and liquid. The present invention further includes imitation palm trees threadably engageable with the base. Shelter is provided by a cone-shaped canopy including an access hatch. The canopy is attached to the palm trees via spaced support tabs and can be removed therefrom during routine cleaning. Furthermore, shelter is provided with a wall consisting of elongated posts extending between the base and the canopy in a substantially arcuate path. The base is also provided with a notch so that an animal can readily access their food without having to step onto the top surface of the base.

5 Claims, 4 Drawing Sheets

ANIMAL FEEDING STATION

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a pet feeding unit and, more particularly, to a decorative pet feeding unit for protecting a pet's food from the environment while providing an aesthetically pleasing food accessory.

2. Prior Art

Animal owners, such as dog and cat owners, are generally required to feed and water their animals on a daily basis in order to maintain the health of the animal. In addition, due to the busy nature of today's world, animal owners often don't have time to provide their pets adequate exercise. In such instances owners will often leave their pets in the back yard during the day or let them roam around outside at night.

In such a case, a problem arises concerning a proper supply of food and water, as well as shelter, for the animal outdoors. The animal's feed and water are often spoiled by the environment resulting in a substantial waste. Because of the inherent problem of spoilage of the feed and water, animals are many times not provided with the desired amount of feed and water during the time outdoors. Thus, a need has long existed for an improved animal shelter having a feed dispenser which could enable the owner of the animal to store a supply of feed and water in the feed dispenser so that the feed and water would be available to the animal at all times.

Previously, animal shelters were clumsy and heavy to move, made out of wood and uncomfortably hot in summer and cold in winter, wherein the shelters would rapidly deteriorate with the weather both in appearance and utility. Furthermore, most animal shelters did not provide an outside feeding stall which can not be easily knocked over by the animal or its tether, nor a tether which cannot become tangled and/or shortened to limit the initial range of movement of the animal.

Accordingly, a need remains for a specially designed pet feeder that protects food from sun or inclement weather conditions while providing a practical, durable and convenient product.

BRIEF SUMMARY OF THE INVENTION

In view of the foregoing background, it is therefore an object of the present invention to provide an animal feeding station for sheltering foodstuff from environmental conditions. These and other objects, features, and advantages of the invention are provided by a pet-feeding apparatus for domesticated pets. The apparatus includes a base that has a substantially planar bottom surface and a contoured top surface integral therewith.

Such a top surface has a plurality of receptacles formed therein for receiving and storing food and liquid for pet consumption and is provided with a plurality of threaded female receptacles. Advantageously, the base has a notch formed therein for allowing a pet to access the plurality of receptacles from a ground surface. The base and the palm trees may be formed from durable plastic material, or other suitable non-corrosive material well-known in the industry.

The present invention further includes a plurality of imitation palm trees spaced about the top surface and extending vertically therefrom. Such a plurality of palm trees have trunk and branch portions oppositely disposed along a length thereof wherein the trunk portions have upper and lower portions respectively. Such lower trunk portions are threadably engageable with the threaded female receptacles spaced along the top surface. Furthermore, the upper trunk portions are removably engageable with the branch portions at an elevated distance above the top surface.

Advantageously, the present invention further includes a canopy that has a substantially cone shape and includes a hatch so that a pet owner can access the receptacles for replenishment. Such a hatch is removably connected to the canopy via a plurality of fastening members. The canopy further includes a plurality of support tabs spaced about a perimeter thereof and protruding substantially orthogonally therefrom. Such support tabs are removably engageable with the trunk portions for providing support when the canopy is positioned thereon. The support tabs are preferably connected to the trunk portions via a plurality of removable pins.

Advantageously, the present invention further includes a wall for providing shelter from inclement weather and wind. Such a wall includes a plurality of elongated posts that have a centrally disposed longitudinal axis and opposed end portions juxtaposed between the top surface and a partial length of the perimeter of the canopy respectively. The wall may have a substantially arcuate shape and is disposed rearward of the plurality of receptacles.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
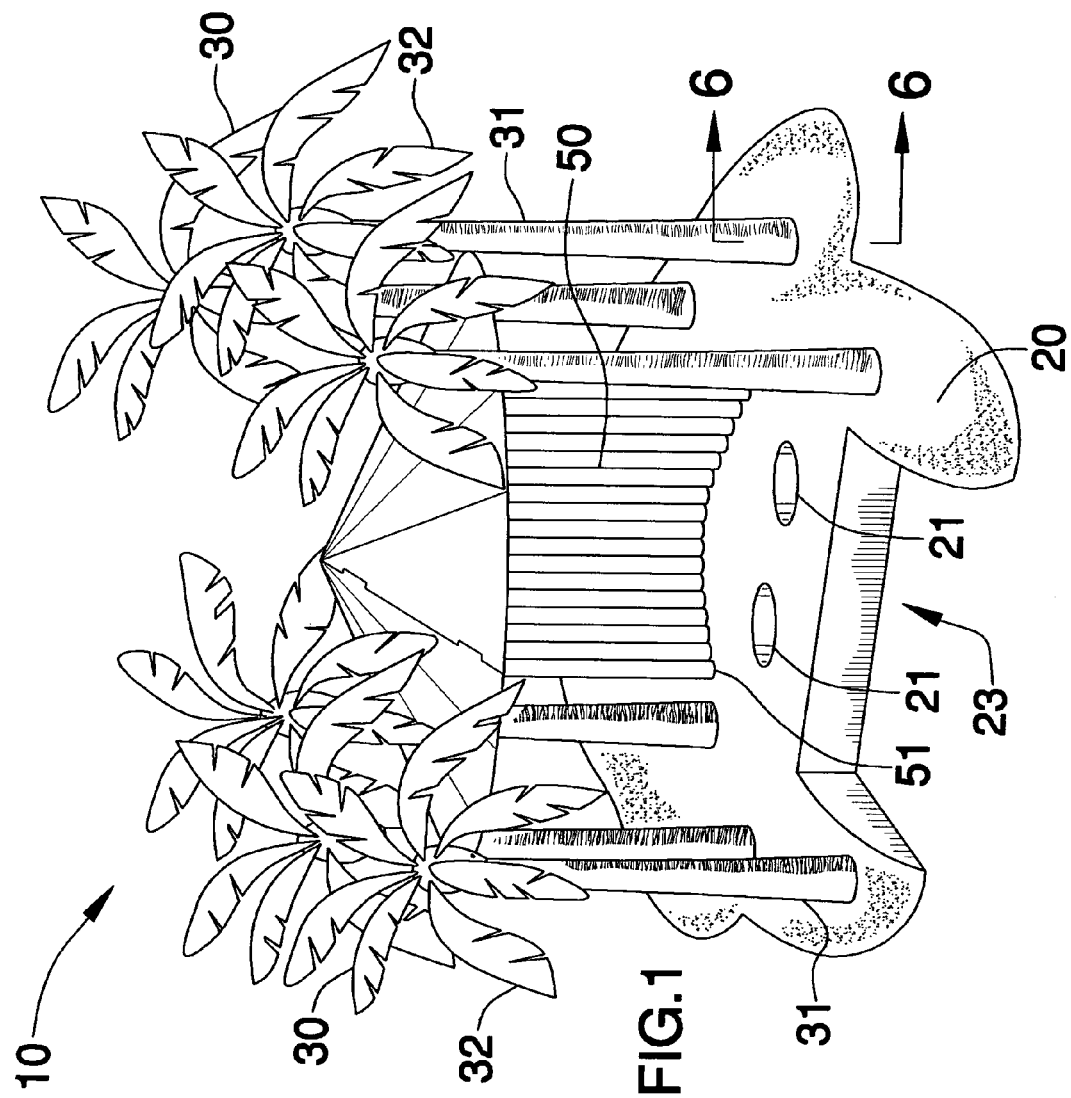
FIG. 1 is a perspective view showing pet feeding station for protecting pet food and water from the environment, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1–6 by the reference numeral 10 and is intended to protect a pet's food from the environment while providing an aesthetically pleasing accessory. It should be understood that the apparatus 10 may be produced in a selection of sizes and shapes and in various colors that are suitable for individual animal breeds.

Figure 4:
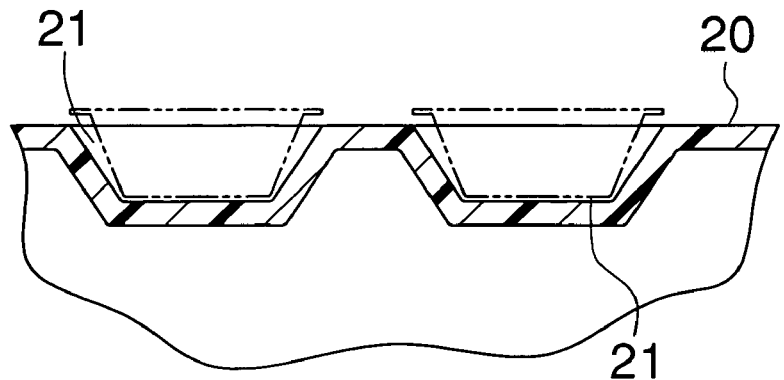
FIG. 4 is a cross-sectional view of the receptacles shown in FIG. 1.

Initially referring to FIGS. 1 and 4, the apparatus 10 includes a base 20 that has a substantially planar bottom surface and a contoured top surface integral therewith. Such a top surface has a plurality of receptacles 21 formed therein for receiving and storing food and liquid for pet consumption. The top surface is further provided with a plurality of threaded female receptacles 22, best shown in FIG. 6. Advantageously, the base 20 has a notch 23 formed therein for allowing a pet to access the plurality of receptacles 21 from a ground surface. The base 20 and palm trees 30 may be formed from durable plastic material, or other suitable non-corrosive material well-known in the industry.

Figure 6:
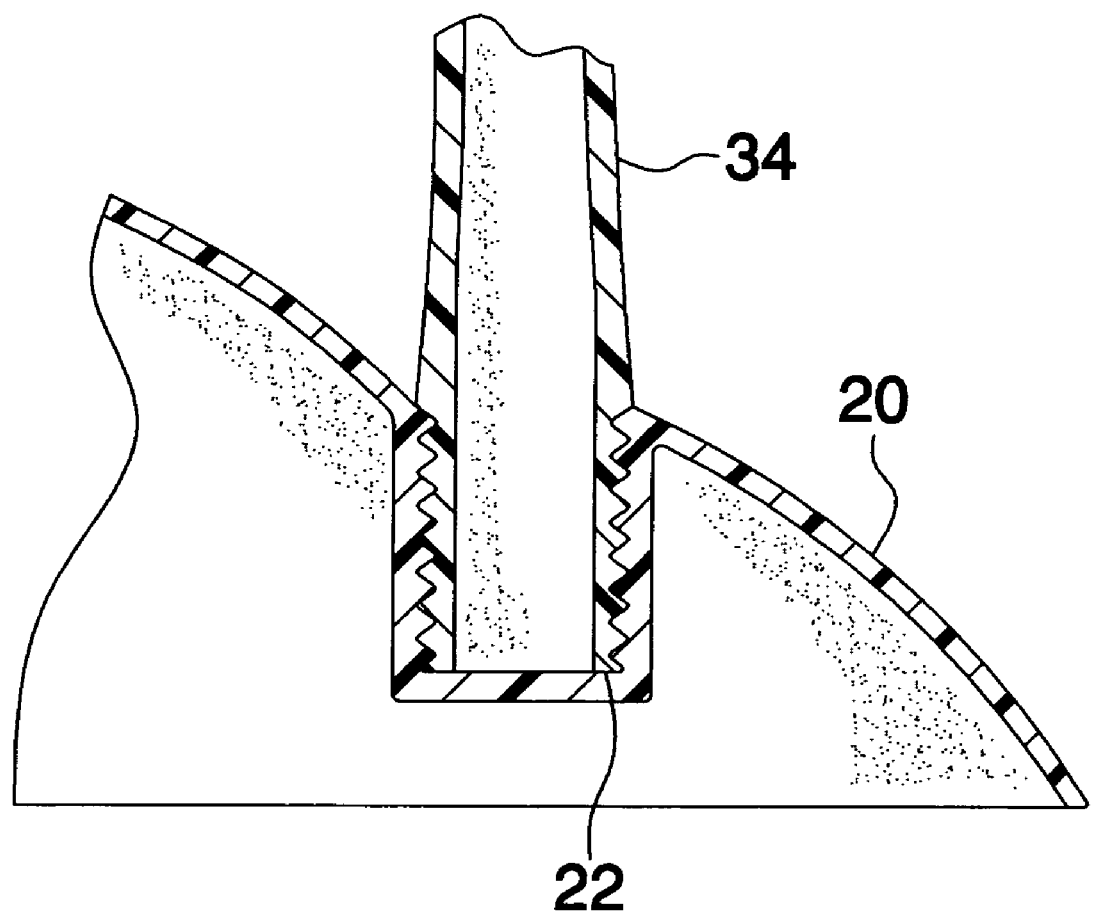
FIG. 6 is an enlarged cross-sectional view showing the tree trunks threadably engageable with the top surface of the base, taken along line 6—6.

The present invention further includes a plurality of imitation palm trees 30 spaced about the top surface and extending vertically therefrom. Such a plurality of palm trees 30 have trunk 31 and branch 32 portions oppositely disposed along a length thereof wherein the trunk portions 31 have upper and lower 34 portions respectively. Such lower trunk portions 34 are threadably engageable with the threaded female receptacles 22 spaced along the top surface, as best shown in FIG. 6. Furthermore, the upper trunk portions are removably engageable with the branch portions 32 at an elevated distance above the top surface.

Figure 5:
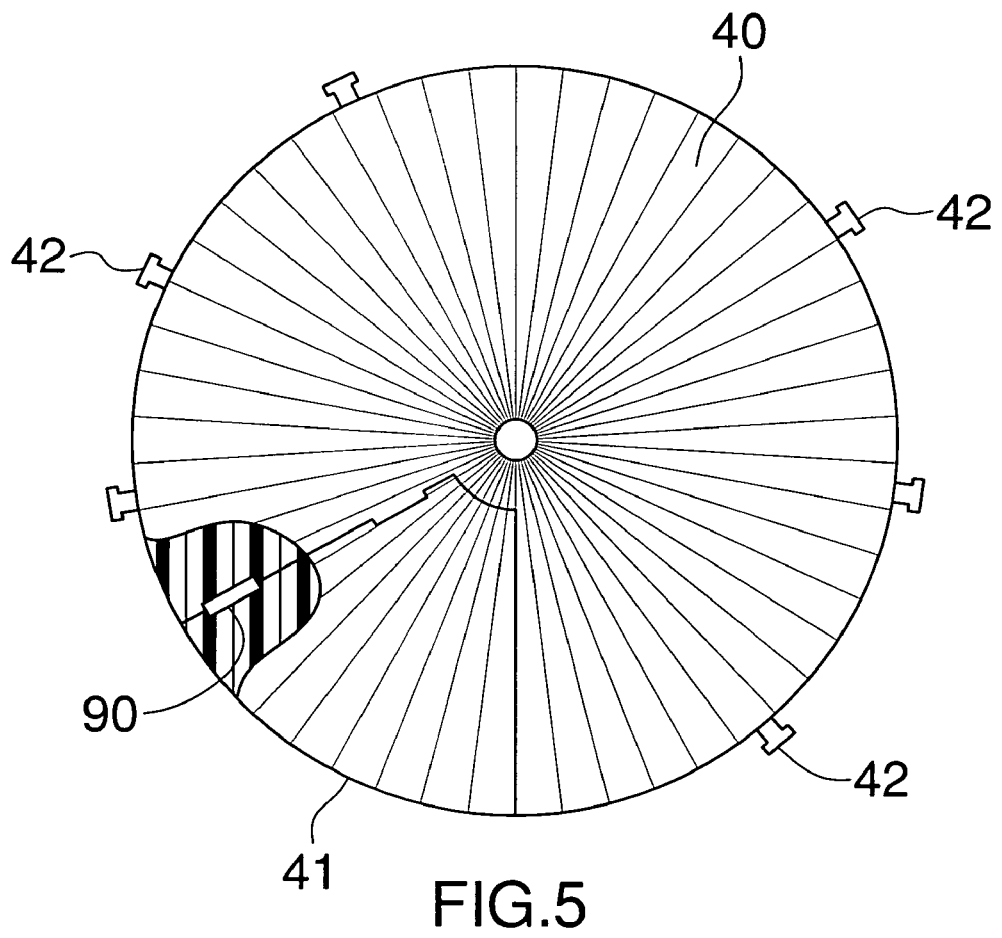
FIG. 5 is a top plan view of the canopy shown in FIG. 1.

Referring to FIG. 5, the present invention advantageously includes a canopy 40 that has a substantially cone shape and includes a hatch 41 so that a pet owner can access the receptacles 21 for replenishment. Such a hatch 41 is removably connected to the canopy 40 via a plurality of fastening members (90). The canopy 40 further includes a plurality of support tabs 42 spaced about a perimeter thereof and protruding substantially orthogonally therefrom.

Figure 2:
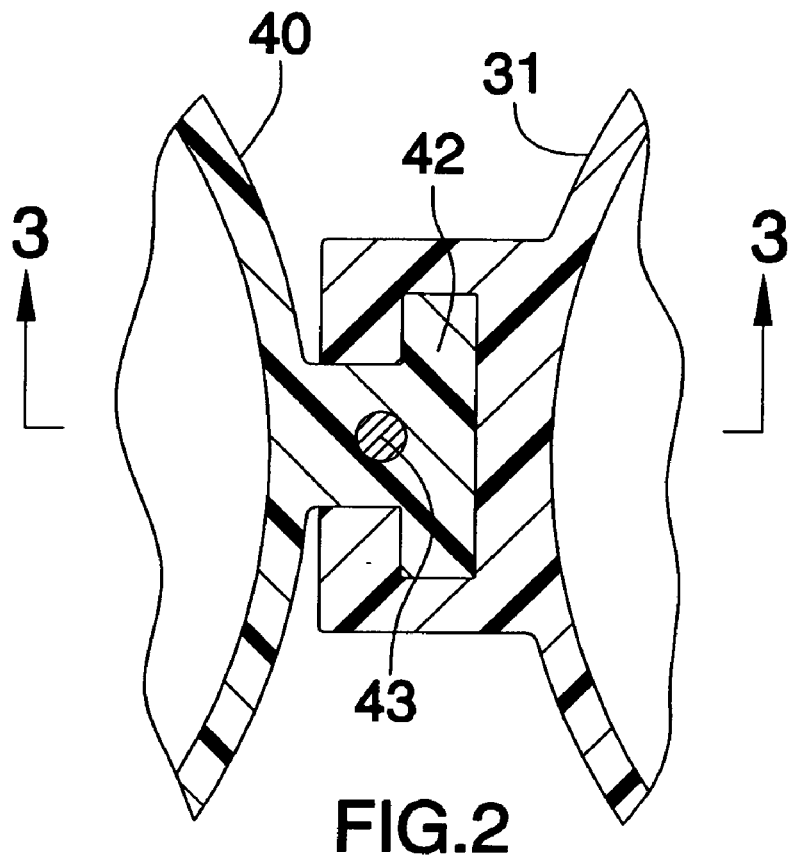
FIG. 2 is a cross-sectional view showing the connection between the canopy and tree trunks in FIG. 1.
Figure 3:
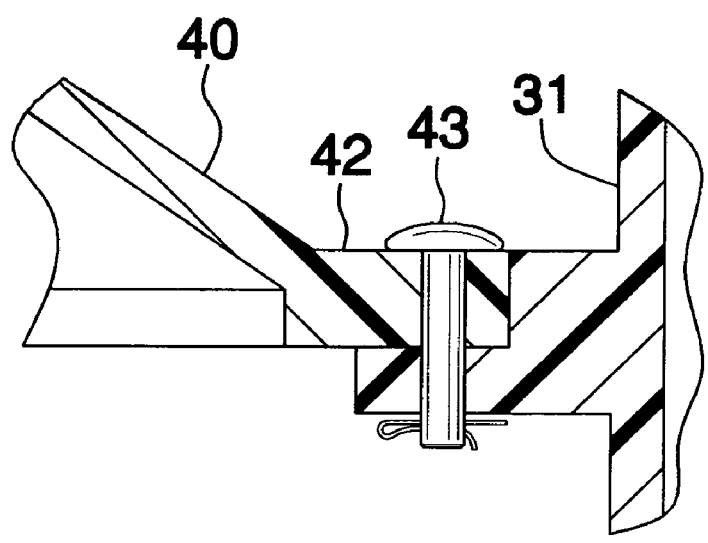
FIG. 3 a cross-sectional view showing the quick-release pin connection of FIG. 2, taken along line 3—3.

Such support tabs 42 are removably engageable with the trunk portions 31 for providing support when the canopy 40 is positioned thereon. The support tabs 42 are preferably connected to the trunk portions 31 via a plurality of removable pins 43, as best shown in FIGS. 2 and 3. The canopy 40 prevents the rapid evaporation of a pet's water and spoilage of food, which often occurs in direct sunlight.

Returning to FIG. 1, the present invention further includes a wall 50 for providing shelter from inclement weather and wind. Such a wall 50 includes a plurality of elongated posts 51 that have a centrally disposed longitudinal axis and opposed end portions juxtaposed between the top surface and a partial length of the perimeter of the canopy 40 respectively. The wall 50 may have a substantially arcuate shape and is disposed rearward of the plurality of receptacles 21. The advantages provided by the present invention may appeal to not only pet owners, but to those that provide professional care services to pets.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An animal feeding station for domesticated pets comprising:
    a base having a substantially planar bottom surface and a contoured top surface integral therewith, said top surface having a plurality of receptacles formed therein for receiving and storing food and liquid for pet consumption, said top surface further having a plurality of threaded female receptacles;
    a plurality of imitation palm trees spaced about said top surface and extending vertically therefrom, said plurality of palm trees having trunk and branch portions oppositely disposed along a length thereof wherein said trunk portions have upper and lower portions respectively, said lower trunk portions being threadably engageable with said threaded female receptacles, said upper trunk portions being removably engageable with said branch portions at an elevated distance above said top surface;
    a canopy having a substantially cone shape and including a hatch so that a pet owner can access said receptacles for replenishment, said hatch being removably connected to said canopy via a plurality of fastening members, said canopy further including a plurality of support tabs spaced about a perimeter thereof and protruding substantially orthogonally therefrom, said support tabs being removably engageable with said trunk portions for providing support when said canopy is positioned thereon; and
    a wall for providing shelter from inclement weather and wind, said wall comprising a plurality of elongated posts having a centrally disposed longitudinal axis and opposed end portions juxtaposed between said top surface and a partial length of the perimeter of said canopy respectively.

2. The station of claim 1, wherein said base and said palm trees are formed from durable plastic material.

3. The station of claim 1, wherein said base has a notch formed therein for allowing a pet to access the plurality of receptacles from a ground surface.

4. The station of claim 1, wherein said support tabs are connected to said trunk portions via a plurality of removable pins.

5. The station of claim 1, wherein said wall has a substantially arcuate shape and is disposed rearward of the plurality of receptacles.

* * * * *